US005731369A

United States Patent [19]

Mahoney

[11] Patent Number: 5,731,369
[45] Date of Patent: Mar. 24, 1998

[54] COLD CURING EPOXY RESIN FORMULATIONS COMPRISING AMINE-FREE ANTIMONY PENTAFLUORIDE-ALCOHOL COMPLEX

[75] Inventor: Wayne S. Mahoney, St. Paul, Minn.

[73] Assignee: Minnesota Mining and Manufacturing Company, St. Paul, Minn.

[21] Appl. No.: 671,281

[22] Filed: Jun. 27, 1996

[51] Int. Cl.⁶ ............................ C08G 59/68; C08G 65/10
[52] U.S. Cl. ........................ 523/458; 523/466; 528/92; 427/137
[58] Field of Search .................. 528/92; 523/458, 523/466; 427/137

[56] References Cited

U.S. PATENT DOCUMENTS

| | | | |
|---|---|---|---|
| 2,952,192 | 9/1960 | Nagin | 94/1.5 |
| 3,379,653 | 4/1968 | Ernst et al. | 260/2 |
| 3,787,349 | 1/1974 | Eliasson | 260/37 |
| 4,088,633 | 5/1978 | Gurney | 260/47 |
| 4,255,468 | 3/1981 | Olson | 427/137 |
| 4,503,161 | 3/1985 | Korbel et al. | 502/159 |
| 4,503,211 | 3/1985 | Robins | 528/92 |

OTHER PUBLICATIONS

*Chemical Abstracts*, vol. 105, No. 20, 17 Nov. 1986, Abstract No. 173107; and *Polym. Prepr.*, vol., 27, No. 2, 1986, pp. 165–166.

Encyclopedia of Polymer Science and Tehnology, vol. 6, pp. 322–382, 1986.

*Primary Examiner*—Frederick Krass
*Attorney, Agent, or Firm*—Robert H. Jordan; MarySusan Howard

[57] ABSTRACT

Cold curing epoxy resin compositions contain an epoxy functional component having an average epoxide functionality greater than 1; a hydroxy functional component; a pigment, a filler or a mixture thereof; and an $SbF_5$-alcohol complex curing agent in an amount effective to cure the epoxide composition. The cure rate of the compositions can be controlled by manipulating the pH and concentration of the filler and/or the pigment, making the use of amine rate controlling agents unnecessary. The compositions may be used, for example, as pavement marking compositions.

21 Claims, No Drawings

COLD CURING EPOXY RESIN FORMULATIONS COMPRISING AMINE-FREE ANTIMONY PENTAFLUORIDE-ALCOHOL COMPLEX

FIELD OF THE INVENTION

This invention relates to cold curing epoxy resin compositions containing a $SbF_5$-alcohol complex that are useful, for example, in pavement marking applications. The invention further relates to a method of curing epoxy resin compositions using an amine free SbFs-alcohol complex as the curing agent.

BACKGROUND OF THE INVENTION

Epoxy resins are durable, readily available materials whose use in pavement marking and traffic paint applications, as well as in other coating applications, is known. Resins used in pavement marking applications must be able to meet a number of rigorous performance requirements, including adhesion to road surfaces, weatherability, flowability, and the ability to be applied under changing temperature and pavement surface conditions. In addition to these properties, it is particularly desirable that the composition harden or cure to a track-free or tack-free state in a short time after application, so that the duration of road closures is as short as possible.

Eliasson, U.S. Pat. No. 3,787,349, describes a cold setting road marking material made up of an epoxy resin composition. This composition is cured using a modified $BF_3$ or modified $BF_3$/amine complex as the curing agent. The compositions are said to cure in a period of time ranging from about 10 seconds to about 15 minutes. A relatively high proportion of the curing agent is present in the compositions of the examples, and actual curing times are not reported.

Gurney, U.S. Pat. No. 4,088,633, teaches a two-part epoxy resin system for marking paved surfaces. An amine is used in this system to effect a cure under a variety of road conditions.

U.S. Pat. No. 4,503,211 to Robins is directed to epoxy resin compositions that are curable upon application of heat and that have a long "pot life". The curing agent is a salt of $HSbF_5$-OR and a hindered amine. In these compositions the amine serves as a cure rate modifier, providing the compositions with the desired pot life.

Amines in free or salt form can provide some useful properties to epoxy resin compositions and can help control cure rate, but their use also has certain drawbacks. For example, resin systems that are cured using an amine-containing curing agent can discolor due to the formation of oxo-amine complexes.

There is a need for an epoxy resin formulation that cures in a short amount of time under a variety of conditions and does not require the presence of an amine for curing. There is also a need for a method to control the cure rate of epoxy resin compositions that do not include an amine as a cure rate modifier.

SUMMARY OF THE INVENTION

The invention provides a cold curable epoxy resin composition, said composition made up of:
  (a) an epoxy functional component having an average epoxide functionality greater than 1;
  (b) a hydroxy functional component;
  (c) a pigment, a filler or a combination thereof; and
  (d) an $SbF_5$-alcohol complex in an amount effective to cure the epoxide composition, wherein the $SbF_5$-alcohol complex is free of amine and the total composition is preferably substantially free of amine.

The invention also provides methods of curing an epoxy functional compound or an epoxy resin composition without the addition of heat from an external source. A first method of curing involves adding an amine-free $SbF_5$-alcohol complex to the epoxy functional compound; a second method involves combining a first part comprising an epoxy functional component having an epoxide functionality greater than one and a second part comprising an $SbF_5$-alcohol complex curing agent, wherein the curing agent is free of amine.

Further, the invention provides a method of marking a pavement surface involving the steps of:
  (a) forming a cold curable epoxy resin composition by combining a first part made up of an epoxy functional component having an epoxide functionality greater than one and a second part that contains an $SbF_5$-alcohol complex curing agent, wherein the curing agent is free of amine;
  (b) applying a layer of the cold curable epoxy resin composition to the pavement surface; and
  (c) allowing the cold curable epoxy resin layer to cure without the application of heat from an external source. Pavement surfaces marked by this method are also provided by the invention.

Surprisingly, the cure rate of the epoxy resin compositions can be controlled even though no amine, which is considered to be a cure rate modifier, is present in the curing agent. This can be accomplished by varying the pigments and fillers used in the epoxy resin compositions. I have found that compositions containing fillers and/or pigments that have a neutral or slightly alkaline pH cure more slowly than compositions containing fillers and/or pigments that have an acidic pH. Therefore, by manipulating the pH levels and concentrations of the filler and pigment components, the cure time of the epoxy resin compositions can be varied as desired.

As used in this application, the terms "epoxy functional component" and "epoxy functional compound" refer to those compounds or mixtures of compounds that are curable and have an epoxy functionality of at least one. The term "cold curable epoxy resin composition" refers to the cold curable composition that contains an epoxy functional component and the $SbF_5$-alcohol complex curing agent, along with the other components described infra. Once curing has taken place, this composition is referred to as the "cured epoxy resin composition".

"Cold curable" means that the epoxy resin composition can be cured without the application of heat from an external source. The compositions of the invention cure without application of heat from an external source after application of the composition in a variety of environmental conditions, which will vary considerably with geography and climate.

All weight percentages are based on the total weight of the cold curable epoxy resin composition unless otherwise specified.

DETAILED DESCRIPTION OF THE INVENTION

The cold curable epoxy resin compositions of the invention contain an epoxide functional component, a hydroxy functional component, a filler or a combination thereof, a pigment, and an amine-free $SbF_5$-alcohol complex curing agent. This amine-free curing agent allows the cold curable epoxy resin compositions to cure without application of heat under a variety of conditions, and the rate of cure can be controlled as desired by manipulating the concentration and pH value of the filler and/or pigment components of the composition.

Curing Agent

The curing agent or polymerization catalyst of the invention is a complex of antimony pentafluoride ($SbF_5$) and an alcohol. The antimony pentafluoride-alcohol complex has the desirable properties of being less odorous and corrosive than other Bronsted or Lewis acid catalysts, and importantly provides a faster cure at lower catalyst levels than currently available systems. The ability to obtain a fast cure with low levels of catalyst is valuable not only because the catalyst is expensive to obtain but because this reduces the likelihood that unwanted side reactions will occur after the initial cure.

The alcohol portion of the $SbF_5$-alcohol complex is an aliphatic or aromatic alcohol that is capable of complexing with antimony pentafluoride. The alcohol may contain one or more hydroxy groups, but diols are generally preferred. Of the diols, polymeric or monomeric diols including alkylene diols such as 1,2-ethanediol, 1,3-propanediol, 1,4-butanediol and polyethylene glycol may be used. Diethylene glycol (DEG) is the preferred alcohol portion of the $SbF_5$-alcohol complex.

The antimony pentafluoride and alcohol are present in the complex in approximately a 1:1 molar ratio. The complex can be prepared by combining the $SbF_5$ with the alcohol, with stirring. Because the reaction is exothermic, cooling of the reaction vessel is recommended. Preparation of similar agents are described in U.S. Pat. No. 4,503,211, which is incorporated herein by reference.

The $SbF_5$-alcohol complex curing agent is present in the cold curable epoxy resin composition in an amount effective to cure the composition. Generally, about 0.1 to 5% by weight based on the weight of the epoxy functional component is present, preferably about 0.1 to 2%.

Epoxide

The epoxy functional component of the cold curable epoxy resin composition may be any of the known epoxy functional compounds commonly known as "epoxy resins". These resins are well known in the art and are described in many publications, for example the *Encyclopedia of Polymer Science and Technology*, 6, p.322 (1986).

Suitable classes of epoxy resins include aliphatic epoxy resins; cycloaliphatic epoxy resins such as cyclohexene oxide, vinylcyclohexene oxide, vinylcyclohexene dioxide, 3,4-epoxycyclohexylmethyl-3,4-epoxycyclohexanecarboxylate, bis-(3,4-epoxycyclohexyl) adipate, and 2-(3,4-epoxycyclohexyl-5,5-spiro-3,4-epoxy) cyclohexene-meta-dioxane, available as the ERL™ series of resins available from Union Carbide, NY, N.Y.; and glycidyl ether type epoxy resins such as propylene oxide, epichlorohydrin, styrene oxide, glycidol, the Epon™ series of epoxy resins available from Shell Chemical Co., Houston, Tex., including the diglycidyl ether of bisphenol A and chain extended versions of this material such as Epon™828, 1001, 1004, 1007, 1009 and 2002 or their equivalents available from other manufacturers, dicyclopentadiene dioxide, epoxidized polybutadienes such as the Poly bd™ resins from Elf Atochem, Philadelphia, Pa., 1,4-butanediol diglycidyl ether, polyglycidyl ether of phenolformaldehyde, cresol or novolac resin and resorcinol diglycidyl ether.

Preferred epoxy resins include the ERL™ series of resins, particularly 3,4-epoxycyclohexylmethyl-3,4-epoxycyclohexanecarboxylate, bis-(3,4-epoxycyclohexyl) adipate, and 2-(3,4-epoxycyclohexyl-5,5-spiro-3,4-epoxy) cyclohexene-meta-dioxane and the bisphenol A type Epon™ resins, including 2,2-bis-para(2,3-epoxypropoxy)phenyl propane and chain extended versions of this material.

Blends of the above mentioned epoxy functional materials may also be used. Of the possible blends, combinations of cycloaliphatic epoxy resins and epoxy resins based on bisphenol A are preferred. The combination of ERL™4221 (3,4-epoxycyclohexylmethyl-3,4-epoxycyclohexanecarboxylate) and Epon™828 (chain extended version of a diglycidyl ether of bisphenol A) is particularly preferred.

The epoxy functional component typically makes up about 20 to 80 wt-% of the cold curable epoxy resin composition, based on the total composition weight, preferably about 30 to 70 wt-% and more preferably about 30 to 60 wt-%.

Hydroxy functional component

A hydroxy functional component, made up of one or more compounds containing at least one hydroxy group, is present in the cold curable epoxy resin composition. The hydroxy functional component may be the same as or different from the alcohol used in forming the $SbF_5$-alcohol complex. This component provides a number of beneficial properties to the composition. For example, the hydroxy functional component adds toughness to the composition, aids in chain extension, provides improved impact resistance, adhesion and flexibility, and helps prevent over-crosslinking of the epoxide during curing. The hydroxy functional component also provides a means of delivering the $SbF_5$-alcohol complex to the epoxy functional component. However, as the amount of hydroxy functional component present increases there is a gradual decrease in other desirable properties such as hardness, tensile strength, and solvent resistance.

The hydroxy functional component may be a mono- or poly- alcohol. The mono- functional alcohols may be aliphatic or aromatic and generally have 1 to 18 carbon atoms. Examples of useful mono- alcohols include methanol, ethanol, 1-propanol, 2-propanol, 2-methyl-2-propanol, 1-butanol, 2-butanol, 1-pentanol, neopentyl alcohol, 3-pentanol, 1-hexanol, 1-heptanol, 1-octanol, 2-phenoxyethanol, cyclopentanol, cyclohexanol, cyclohexylmethanol, 3-cyclohexyl-1-propanol, 2-norbornanemethanol, and tetrahydrofurfuryl alcohol.

Lower molecular weight poly- alcohols useful in this invention generally have 2 to 5, preferably 2 to 4, hydroxyl groups. Examples of such low molecular weight hydroxy functional components include 1,2-ethanediol, 1,2-propanediol, 1,3-propanediol, 1,4-butanediol, 1,3-butanediol, 2-methyl-1,3-propanediol, 2,2-dimethyl-1,3-propanediol,, 2-ethyl-1,6-hexanediol, 1,5-pentanediol, 1,8-octanediol, neopentyl glycol, glycerol, trimethylolpropane, 1,2,6-hexanetriol, trimethylolethane, pentaerythritol, quinitol, mannitol, diethylene glycol, triethylene glycol, tetraethylene glycol, glycerine, 2-ethyl-2-(hydroxymethyl)-1,3-propanediol, 2-ethyl-1,3-pentanediol, 2,2-oxdiethanol, sorbitol, 1,4-cyclohexane dimethanol, 1,4-benzene dimethanol, 2-butene-1,4-diol, and polyalkoxylated bisphenol A derivatives. Other useful hydroxy functional compounds are described in U.S. Pat. No. 4,503,211.

Higher molecular weight hydroxy functional compounds useful in the compositions of the invention include the polyethylene and polypropylene oxide polymers in the molecular weight range of about 200 to 20,000 such as the Carbowax™ polyethylene oxide materials available from Union Carbide, caprolactone hydroxy functional compounds in the molecular weight range of about 200 to 5,000 such as the Tone™ materials available from Union Carbide, polytetramethylene ether glycol in the molecular weight range of about 200 to 4000 such as the PolyTHF™ materials available from BASF, Parsippany, N.J., hydroxyl terminated polybutadiene resins such as the Poly bd™ materials available from Elf Atochem, or equivalent materials available from other suppliers. Of these materials PolyTHF™ 250, a polytetramethylene ether glycol is preferred.

The hydroxy functional component can be present as a mixture of alcohols and can contain a combination of mono- and poly- hydroxyl containing compounds. The hydroxy functional component is present in the cold curable epoxy resin composition in an amount effective to provide the desired properties to the composition. Too high a concentration of hydroxy containing compound will decrease the crosslink density of the cured composition and will decrease the internal strength of the composition; too little hydroxy containing compound may leave the cured composition brittle. Generally, about 5 to 50 wt-% hydroxy functional component is present in the composition, preferably about 10 to 40 wt-%, and more preferably about 20 to 35 wt-%.

Fillers and Pigments

The cold curable epoxy resin compositions of the invention contains one or more fillers, one or more pigments, or a combination thereof. The pigment provides the desired color, opacity and light scattering effect to the composition, while the filler lowers density, allows viscosity to be controlled, and may serve to some degree as a pigmenting agent. In addition, these components alone or in combination can allow the cure rate of the composition of the invention to be controlled. Surprisingly, the pH of these components affects the time required for the composition to gel. In general, higher pH components tend to slow the cure, while lower pH components tend to result in a faster cure.

Illustrative examples of useful fillers include the known clays and silaceous materials, such as kaolin clays and amorphous silicas. Kaolin clays are available in a range of pH values and typically have a pH of about 4 to 7. Examples of suitable clays are Glomax LL, a calcined kaolin clay having a pH of about 4.2 to 5.2 and available from Dry Branch Kaolin Co., Dry Branch, Ga. and Huber 35, a water washed kaolin clay having a pH of about 6.0 to 7.5 and available from J. M. Huber Corp., Macon, Ga.

Any of the known pigments may be used in the cold curable epoxy resin compositions of the invention. Useful pigments include organic colorants, silicates such as clays, the carbonates, the sulfates, and metal oxides such as titanium dioxide. Titanium dioxide is the preferred pigment.

The type and amount of filler and/or pigments used is balanced to provide the desired physical properties to the cured composition as well as the desired cure rate. In general, the filler and pigment should be selected and proportioned such that the overall pH of the cold curable epoxy resin composition is about 3 to 9 and preferably about 4 to 7. Compositions having a pH at the higher end of these ranges will tend to cure more slowly than those having a pH at the lower end of the ranges. The cold curable epoxy resin formulations of the invention can generally contain about 0 to 60 wt-% of a filler, preferably about 10 to 50 wt-% and more preferably about 10 to 40 wt-%. The pigment is typically present in an amount of about 0 to 60 wt-%, preferably about 2 to 40 wt-%.

Additional Components

Other additives or adjuvants may optionally be added to the cold curable epoxy resin compositions. Examples of such ingredients include abrasive granules, glass beads, glass bubbles, retroreflective elements, stabilizers, light stabilizers, antioxidants, flow agents, bodying agents, flatting agents, binders, biocides, preservatives, surfactants, plasticizers, thixotropic agents as dispersion stabilizers, thermoplastics for toughness and coupling agents/adhesion promoters.

Examples of useful adhesion promoters include the silanes, titanates, and zirconates. Silanes are the preferred adhesion promoters, such as the trialkoxy silanes. A particularly preferred coupling agent or adhesion promoter is 3-glycidyloxypropyltrimethoxysilane.

When present, these components together typically comprise about 0.1 to 40 wt-% of the cold curable epoxy resin composition.

The cold curable epoxy resin compositions are prepared by combining the epoxy functional component with the hydroxy functional component, curing agent, and other above described components. The composition will cure without addition of heat from any external source.

The cure rate of the composition will vary with the use of the composition. If applied as a thin film, for example as a pavement marking, the composition desirably cures to a track-free condition in about 0.1 to 10 minutes, preferably about 0.1 to 5 minutes, after application. For other applications, such as a potting compound or composite, curing can take up to about an hour after application. The longer cure time allows for control of the exothermic reaction, thereby preventing damage to heat-sensitive substrates. The slower rate and longer cure time can be achieved by lowering the level of catalyst in the composition, raising the overall pH of the composition, or by balancing these factors as desired.

The preferred method of formulation is to prepare the composition as two separate premixes, known as Part A and Part B. Part A is a premix containing the epoxy functional component, and Part B is a premix containing the hydroxy functional component and curing agent. The two parts can be stored separately until needed, then combined at the time of application in the appropriate ratio. The ratio of the volume of Part A to Part B is typically about 2:1 to 5:1. While the pigment, filler and other ingredients can be present in either or both of the premixes, preferably the total amount of these components is divided between Part A and Part B for ease of combination and control of viscosity. Similarly, a portion of the hydroxy functional component may be present in Part A of the composition, where it can serve as a viscosity reducer or diluent.

The cold curable epoxy resin compositions of the invention are generally applied using a two-part application system that can combine Part A and Part B of the composition in the desired proportions immediately before application. Such systems are known in the art and include the MIXPAC™ two-part gun available from ConProTec Inc., Haverhill, Md.

Uses of the cold curable epoxy resin formulations of the invention are many and include coatings, particularly pavement markings, adhesives, molding compounds, potting compounds, and encapsulating compounds.

For example, in pavement marking applications Part A and Part B are combined, forming the curable epoxy resin composition. The composition is applied to the pavement, which may be asphalt, concrete, brick, or other suitable material, in a thin film. If it is desired to include retroreflective elements in the pavement marking, the composition should remain uncured for a sufficient amount of time to allow desired partial embedding of said elements in the composition.

The invention is further described by reference to the following examples, which are understood to illustrate but not limit the invention.

EXAMPLES

Example 1

The ingredients listed for Part A and Part B below were separately combined and mixed using a high speed disk disperser until a fineness of grind of at least a Hegman 7 (as determined by ASTM D 1210–79), representing a particle size of less than 13µ, was obtained for each mixture. For Part B the $SbF_5$-DEG was added to a premix of the Poly THF 250, $TiO_2$, and Glomax LL. A noticeable decrease in viscosity occurred when the $SbF_5$-DEG was added.

| Ingredient | Parts by weight |
|---|---|
| PART A | |
| ERL 4221 | 52 |
| Epon 828 | 24 |
| $TiO_2$ | 7.5 |
| Glomax LL | 50 |
| Poly THF 250 | 6 |
| PART B | |
| Poly THF 250 | 18 |
| $TiO_2$ | 12 |
| Glomax LL | 13 |
| $SbF_5$-DEG | 0.6 |

The material was delivered using a MIXPAC™ two part gun and a STATOMIX™ static mixer, both available from ConProTec. The material was mixed using a Part A to Part B in a volume ratio of 4:1. A 30 mil (0.762 mm) coating bar was used to coat a polyethylene terephthalate film. This formulation cured in 40 seconds, with cure defined as the point at which a wood applicator did not stick to or could not easily mar the surface of the coating.

Comparative Examples 2, 3 and 4

Compositions were prepared and delivered as in Example 1 above, except that different curing agents were substituted for the $SbF_5$-DEG:

| Example | Catalyst |
|---|---|
| 2 | $BF_3$ (50 wt % in methanol) |
| 3 | Anchor 1170 ($BF_3$-amine complex, available from Air Products, lot 5623) |
| 4 | Anchor 1171 ($BF_3$-amine complex, available from Air Products, lot 725-3) |

The formulation of Example 2 cured in 135 seconds; after 4 days, both Example 3 and Example 4 were still liquid.

Example 5

The following formulation was prepared and applied using the procedure set forth in Example 1. R202 is a hydrophobic amorphous silica added as a thixotropic agent to aid in suspension of the pigment.

| Ingredient | Parts by weight |
|---|---|
| PART A: | |
| ERL 4221 | 52 |
| Epon 828 | 24 |
| $TiO_2$ | 7.5 |
| Huber 35 | 52.5 |
| Poly THF 250 | 6 |
| PART B | |
| Poly THF 250 | 18 |
| R202 | 0.09 |
| $TiO_2$ | 12 |
| Huber 35 | 15 |
| $SbF_5$-DEG | 0.6 |

This formulation was still liquid 15 minutes after application.

Example 6

The following formulation was prepared and applied using the procedure set forth in Example 1. R202 is a hydrophobic amorphous silica added as a thixotropic agent to aid in suspension of the pigment.

| Ingredient | Parts by weight |
|---|---|
| PART A: | |
| ERL 4221 | 52 |
| Epon 828 | 24 |
| $TiO_2$ | 7.5 |
| Huber 35 | 52.5 |
| Poly THF 250 | 6 |
| PART B | |
| Poly THF 250 | 18 |
| R202 | 0.09 |
| $TiO_2$ | 12 |
| Huber 35 | 15 |
| $SbF_5$-DEG | 1.1 |

This formulation was extremely viscous within 15 seconds of application, and cured to a hard coating within 3 minutes. A comparison of the results of Examples 1, 5 and 6 shows that fillers having a higher pH will slow the cure rate of the compositions.

The above specification, Examples, and data provide a complete description of the invention. Since many embodiments of the invention are possible without departing from the spirit and scope of the invention, the invention resides in the claims hereinafter appended.

I claim:

1. A cold curable epoxy resin composition, said composition consisting essentially of:
   (a) an epoxy functional component having an average epoxide functionality greater than 1;
   (b) a hydroxy functional component;
   (c) a pigment, or a filler or a mixture thereof; and
   (d) an $SbF_5$-alcohol complex curing agent in an amount effective to cure the epoxide composition, wherein the curing agent is free of amine and the composition has a pH of about 3 to 9.

2. The composition of claim 1 wherein the hydroxy functional component comprises a polyol.

3. The composition of claim 1 wherein the epoxy functional component comprises a polyglycidyl ether of a polyhydric phenol and/or a cycloaliphatic diepoxide.

4. The composition of claim 1 wherein the hydroxy functional component comprises a glycol.

5. The composition of claim 1 wherein the hydroxy functional component comprises polytetramethylene ether glycol.

6. The composition of claim 1 wherein the $SbF_5$-alcohol complex is an $SbF_5$-diethylene glycol complex.

7. The composition of claim 1 wherein the filler comprises kaolin clay.

8. The composition of claim 1 wherein the $SbF_5$-alcohol complex is present in an amount of about 0.1 to 5% by weight, based on the weight of the curable epoxide composition.

9. A composition capable of curing without addition of heat from an external source, said composition consisting essentially of:
(a) a cycloaliphatic diepoxide;
(b) a diglycidyl ether of bisphenol A;
(c) kaolin clay;
(d) polytetramethylene ether glycol;
(e) titanium dioxide; and
(f) an amine-free $SbF_5$-diethylene glycol complex, said composition having a pH of about 3 to 9.

10. The composition of claim 9, having a Part A and Part B, said Part A containing the cycloaliphatic diepoxide, the diglycidyl ether of bisphenol A, kaolin clay, titanium dioxide, and polytetramethylene ether glycol; and said Part B containing polytetramethylene ether glycol, kaolin clay, titanium dioxide, and the $SbF_5$-diethylene glycol complex.

11. A method of curing an epoxy functional compound without the addition of heat from an external source, the method comprising adding an amine-free $SbF_5$-alcohol complex to the epoxy functional compound at a pH of about 3 to 9.

12. A method of curing a cold curable epoxy resin composition without the addition of heat from an external source, the method comprising combining a first part comprising an epoxy functional component having an epoxide functionality greater than one and a second part comprising an $SbF_5$-alcohol complex curing agent, wherein the curing agent is free of amine and the composition has a pH of about 3 to 9.

13. The method of claim 12 wherein the composition cures in about 6 seconds to 1 hour.

14. The method of claim 12 wherein said first part comprises an epoxy functional component having an average epoxide functionality greater than 1, a pigment, a filler and a hydroxy functional component; and said second part comprises a hydroxy functional component, a pigment, a filler and an $SbF_5$-alcohol complex.

15. The method of claim 12 wherein the $SbF_5$-alcohol complex is an $SbF_5$-diethylene glycol complex.

16. An epoxy resin composition cured by the method of claim 12.

17. A method of marking a pavement surface, the method comprising:
(a) forming a cold curable epoxy resin composition by combining a first part comprising an epoxy functional component having an epoxide functionality greater than one and a second part comprising an $SbF_5$-alcohol complex curing agent, wherein the curing agent is free of amine and the composition has a pH of about 3 to 9;
(b) applying a layer of the cold curable epoxy resin composition to the pavement surface; and
(c) allowing the cold curable epoxy resin layer to cure without the application of heat from an external source.

18. The method of claim 17 further comprising the step of applying retroreflective elements to the layer before curing is complete.

19. A pavement surface that has been marked by the method of claim 17.

20. A pavement surface that has been marked by the method of claim 18.

21. A cold curable epoxy resin composition comprising a Part A and a Part B, wherein Part A comprises an epoxy functional component having an average epoxide functionality greater than 1 and a pigment, a filler or a mixture thereof and Part B comprises a hydroxy functional component and an $SbF_5$-alcohol complex curing agent in an amount effective to cure the epoxide composition, wherein the curing agent is free of amine and the composition has a pH of about 3 to 9.

* * * * *